United States Patent
Lee et al.

(10) Patent No.: US 11,166,298 B2
(45) Date of Patent: Nov. 2, 2021

(54) METHOD AND USER EQUIPMENT FOR TRANSMITTING UPLINK SIGNAL USING SEMI-PERSISTENT SCHEDULING RESOURCE

(71) Applicant: LG Electronics Inc., Seoul (KR)

(72) Inventors: Gyeongcheol Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/645,365

(22) PCT Filed: Sep. 6, 2018

(86) PCT No.: PCT/KR2018/010440
§ 371 (c)(1),
(2) Date: Mar. 6, 2020

(87) PCT Pub. No.: WO2019/050302
PCT Pub. Date: Mar. 14, 2019

(65) Prior Publication Data
US 2021/0014875 A1 Jan. 14, 2021

Related U.S. Application Data

(60) Provisional application No. 62/555,069, filed on Sep. 7, 2017.

(51) Int. Cl.
*H04W 72/12* (2009.01)
*H04W 28/02* (2009.01)
*H04W 80/02* (2009.01)

(52) U.S. Cl.
CPC ... *H04W 72/1257* (2013.01); *H04W 28/0278* (2013.01); *H04W 72/1268* (2013.01); *H04W 80/02* (2013.01)

(58) Field of Classification Search
CPC ......... H04W 72/1257; H04W 28/0278; H04W 72/1268; H04W 80/02; H04W 72/0413
See application file for complete search history.

(56) References Cited

U.S. PATENT DOCUMENTS

| 2010/0077100 A1* | 3/2010 | Hsu | H04W 8/24 709/234 |
| 2016/0066343 A1* | 3/2016 | Lin | H04L 5/0044 370/280 |
| 2017/0071010 A1* | 3/2017 | Lim | H04W 72/042 |

FOREIGN PATENT DOCUMENTS

KR  20170029379  3/2017

OTHER PUBLICATIONS

International Search Report and Written Opinion, PCT/KR2018/010440, dated Feb. 8, 2019, 11 pages.
(Continued)

*Primary Examiner* — Afshawn M Towfighi
(74) *Attorney, Agent, or Firm* — Fish & Richardson P.C.

(57) ABSTRACT

In the present invention, a UE configured with a SPS resource which occurs periodically for a predetermined time duration transmits indication information using the last SPS resource which occurs last in the predetermined time duration, if the last SPS resource is not sufficient to accommodate uplink data available for transmission. The indication information informs a network that there is uplink data remaining after the UE performs uplink data transmission on the last SPS resource.

12 Claims, 13 Drawing Sheets

(56) References Cited

OTHER PUBLICATIONS

3rd Generation Partnership Project; Samsun, "Feedback for SPS activation/deactivation," R2-163671, 3GPP TSG-RAN WG2, Nanjing, China, dated May 23-27, 2016, 6 pages.
3rd Generation Partnership Project; Ericsson, "Semi-persistent scheduling for NB-IoT," R1-1712623, 3GPP TSG-RAN WG1, Prague, Czech Republic, Aug. 21-25, 2017, 3 pages.
3rd Generation Partnership Project; LG Electronics Inc., "Semi-persistent scheduling in NR," R2-1704496, 3GPP TSG-RAN WG2, Hangzhou, China, dated May 15-19, 2017, 3 pages.
3rd Generation Partnership Project; Samsung, "Potential Issues for BSR Latency Reduction," R2-1705593, 3GPP TSG RAN WG2, Hangzhou, China, May 15-19, 2017, 3 pages.
3rd Generation Partnership Project; Huawei, HiSilicon, Neul, "Semi-Persistent Scheduling in NB-IoT," R2-1708302, 3GPP TSG-Ran WG2, Berlin, Germany, Aug. 21-25, 2017, 5 pages.
EP Extended European Search Report in European Appln. No. 18854642.8, dated May 17, 2021, 8 pages.
Ericsson, "Remaining issues with SPS with skip padding and short periods," R2-165354, 3GPP TSG-RAN WG2 #95, Gothenburg, Sweden, dated May 22-26, 2016, 3 pages.

\* cited by examiner (a) Control-Plane Protocol Stack (b) User-Plane Protocol Stack (a)

(b)

METHOD AND USER EQUIPMENT FOR TRANSMITTING UPLINK SIGNAL USING SEMI-PERSISTENT SCHEDULING RESOURCE

CROSS-REFERENCE TO RELATED APPLICATIONS

This application is a National Stage application under 35 U.S.C. § 371 of International Application No. PCT/KR2018/010440, filed on Sep. 6, 2018, which claims the benefit of U.S. Provisional Application No. 62/555,069, filed on Sep. 7, 2017. The disclosures of the prior applications are incorporated by reference in their entirety.

TECHNICAL FIELD

The present invention relates to a wireless communication system, and more particularly, to a method for transmitting uplink signals a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting uplink signals in a wireless communication system. The method comprises: receiving configuration information for configuring a semi-persistent scheduling (SPS) resource which occurs periodically for a predetermined time duration; triggering indication information if a last SPS resource which occurs last in the predetermined time duration is not sufficient to accommodate uplink data available for transmission; and transmitting the indication information on the last SPS resource.

In another aspect of the present invention, provided herein is a user equipment for transmitting uplink signals in a wireless communication system. The user equipment comprises a transceiver, and a processor configured to control the transceiver. The processor may be configured to: control the transceiver to receive configuration information for configuring a semi-persistent scheduling (SPS) resource which occurs periodically for a predetermined time duration; trigger indication information if a last SPS resource which occurs last in the predetermined time duration is not sufficient to accommodate uplink data available for transmission; and control the transceiver transmit the indication information on the last SPS resource.

In each aspect of the present invention, the indication information may be a buffer status report (BSR).

In each aspect of the present invention, the BSR may be included in a medium access control (MAC) protocol data unit (PDU) transmitted on the last SPS resource In each aspect of the present invention, the BSR may be a BSR MAC control element in the MAC PDU.

In each aspect of the present invention, the BSR MAC CE may include a buffer size field set to the amount of the remaining uplink data.

In each aspect of the present invention, the indication information may be a field in a MAC subheader of a MAC PDU transmitted on the last SPS resource.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to an example of the present invention, delay/latency occurring during communication between a user equipment and a BS may be reduced.

Also, signals in a new radio access technology system can be transmitted/received effectively.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate examples of the invention and together with the description serve to explain the principle of the invention.

MODE FOR INVENTION

Figure 1:
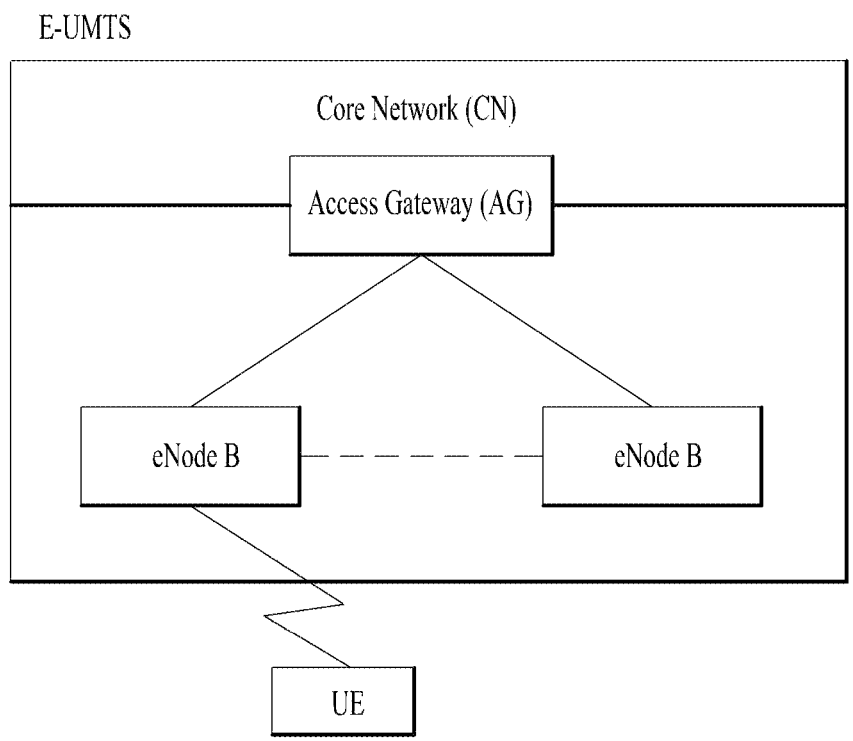
FIG. 1 is a view schematically illustrating a network structure of an evolved universal mobile telecommunication system (E-UMTS) as an exemplary radio communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based wireless communication system. However, the technical features of the present invention are not limited thereto. For example, although the following detailed description is given based on a mobile communication system corresponding to a 3GPP based system, aspects of the present invention that are not limited to 3GPP based system are applicable to other mobile communication systems.

For example, the present invention is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

Meanwhile, a 3GPP based system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the recent 3GPP based wireless communication standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity (DC) operation the term "special Cell" refers to the PCell of the master cell group (MCG) or the PSCell of the secondary cell group (SCG), otherwise the term Special Cell refers to the PCell. The MCG is a group of serving cells associated with a master BS which terminates at least S1-MME, and the SCG is a group of serving cells associated with a secondary BS that is providing additional radio resources for the UE but is not the master BS. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
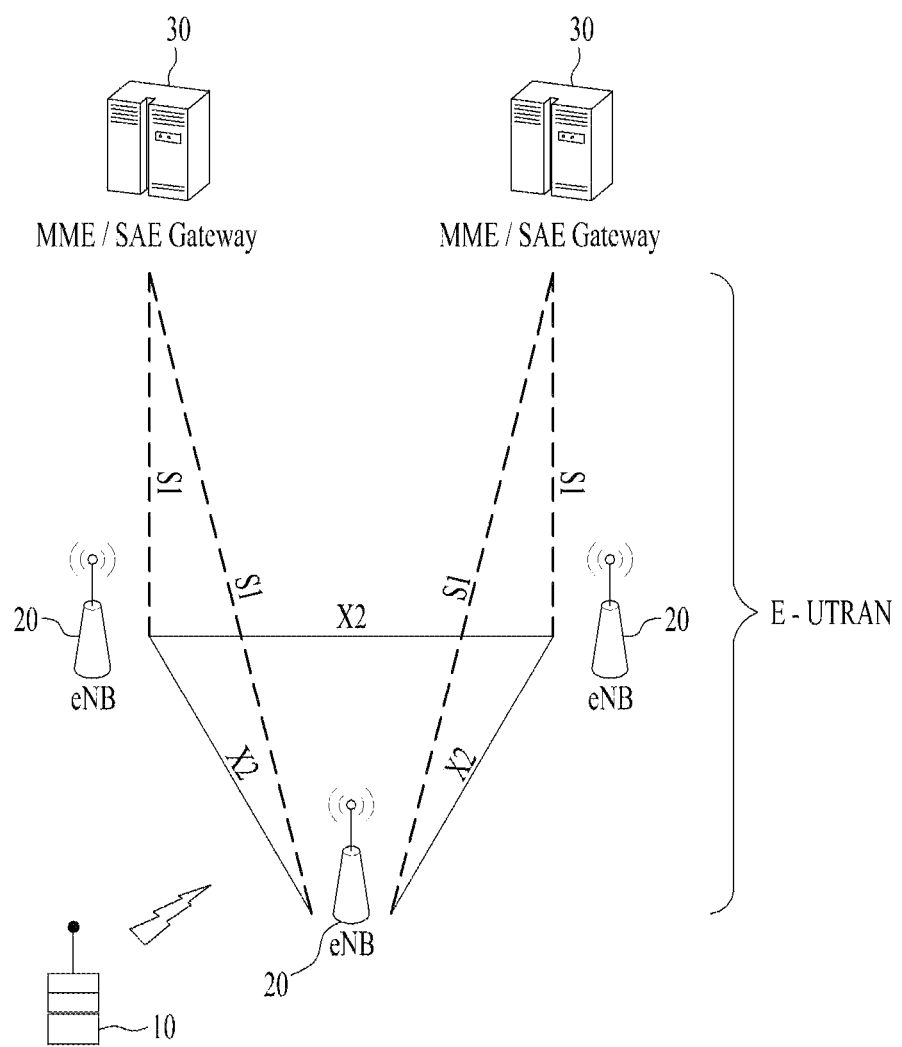
FIG. 2 is a block diagram illustrating network structure of an evolved universal terrestrial radio access network (E-UTRAN).

FIG. 2 is a block diagram illustrating network structure of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

Figure 3:
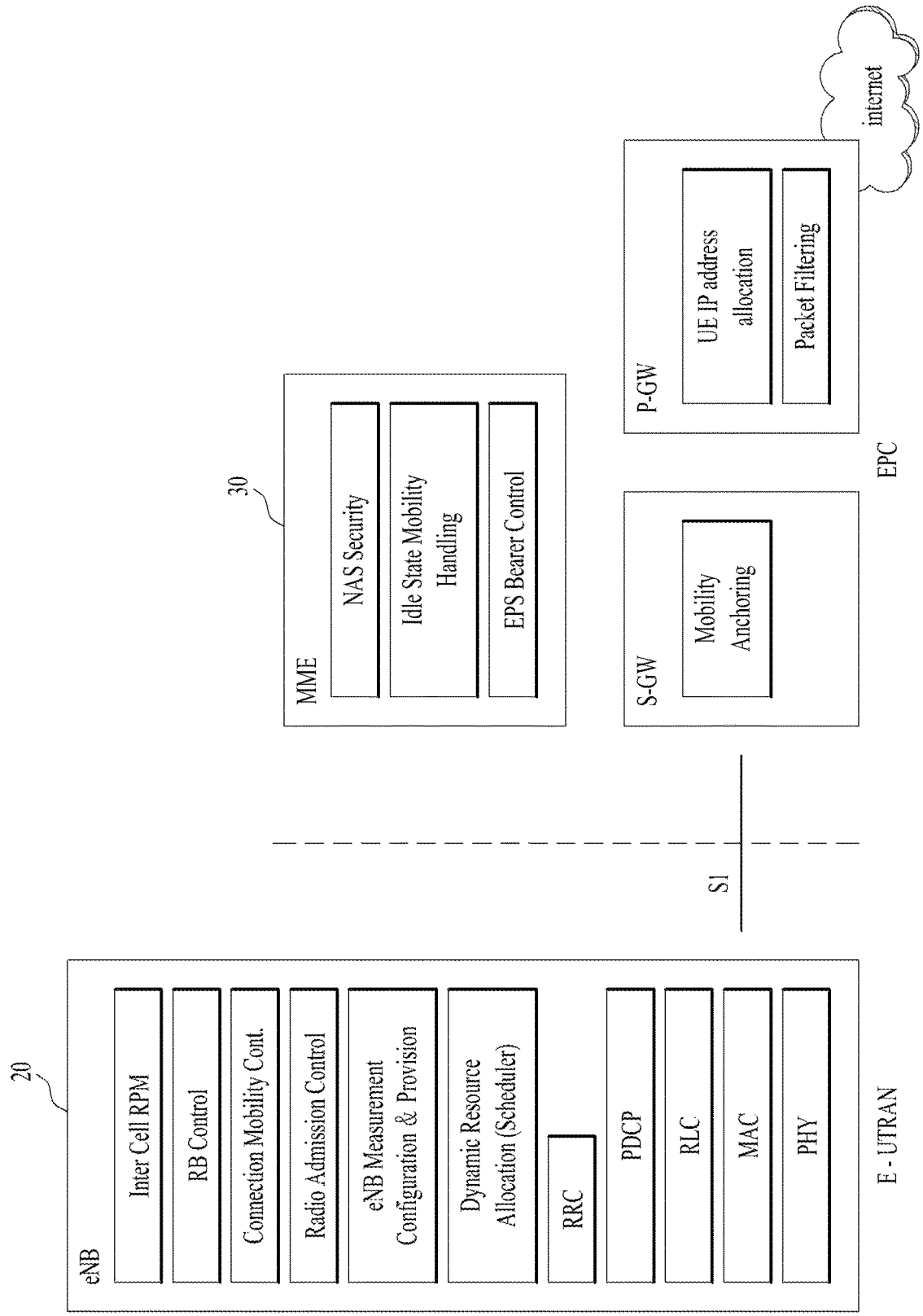
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
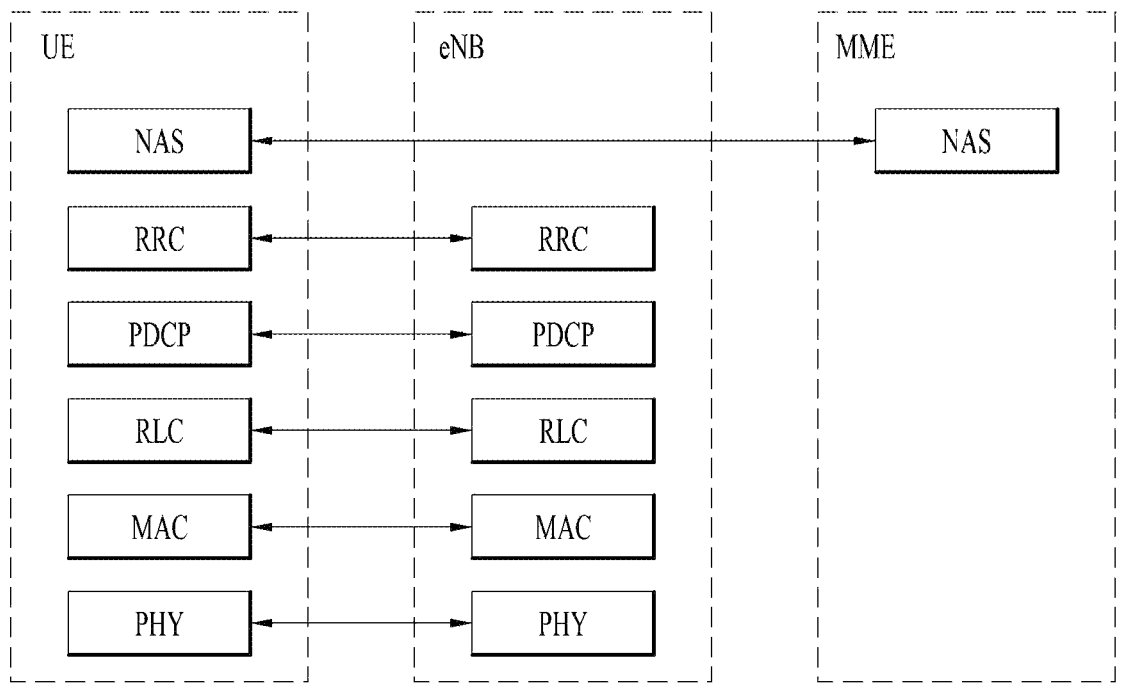
FIG. 4 is a diagram showing a control plane and a user plane of a radio interface protocol between a UE and an E-UTRAN based on a 3GPP radio access network standard.
Figure 4:
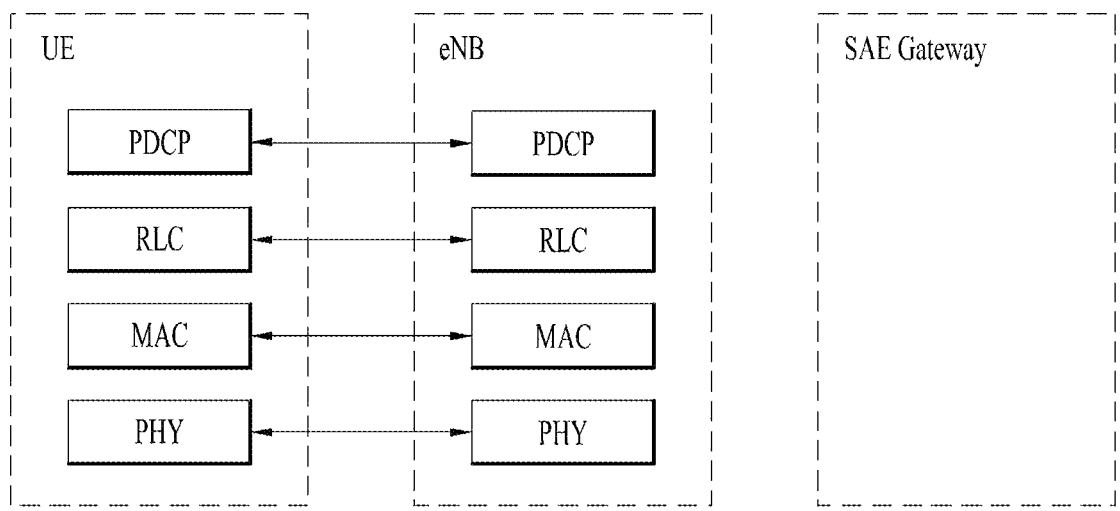

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by means of dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split bearers in DC and LWA bearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
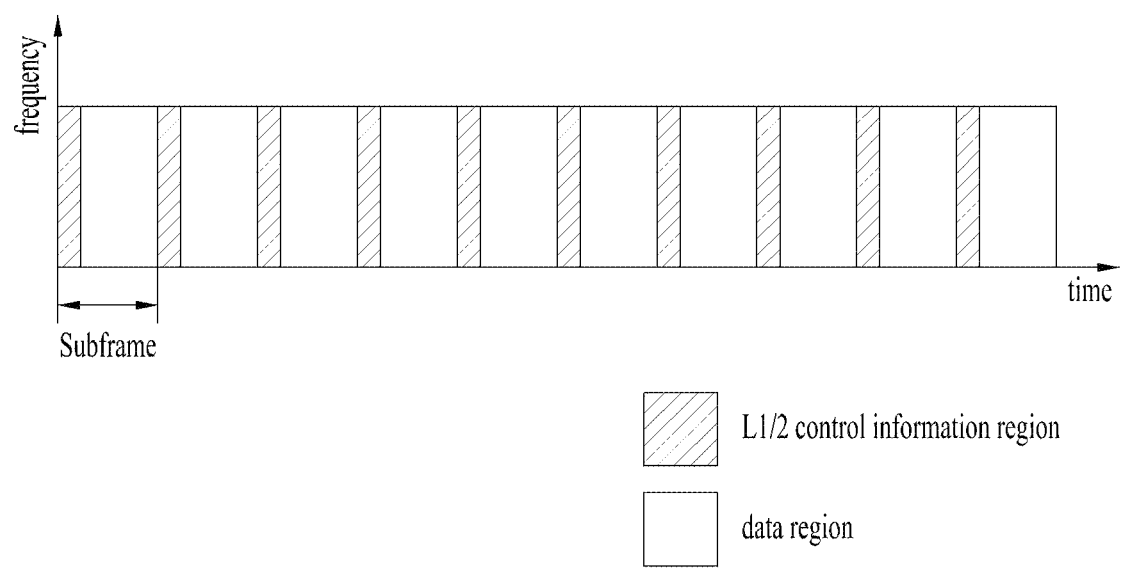
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one example, a radio frame of 10 ms is used and one radio frame includes 10 subframes. In addition, in LTE, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a downlink shared channel (DL-SCH) which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one example, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to an RNTI means that the PDCCH is cyclic redundancy check masked (CRC-masked) with the RNTI. A UE may attempt to decode a PDCCH using the certain RNTI if the UE is monitoring a PDCCH addressed to the certain RNTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

Figure 6:
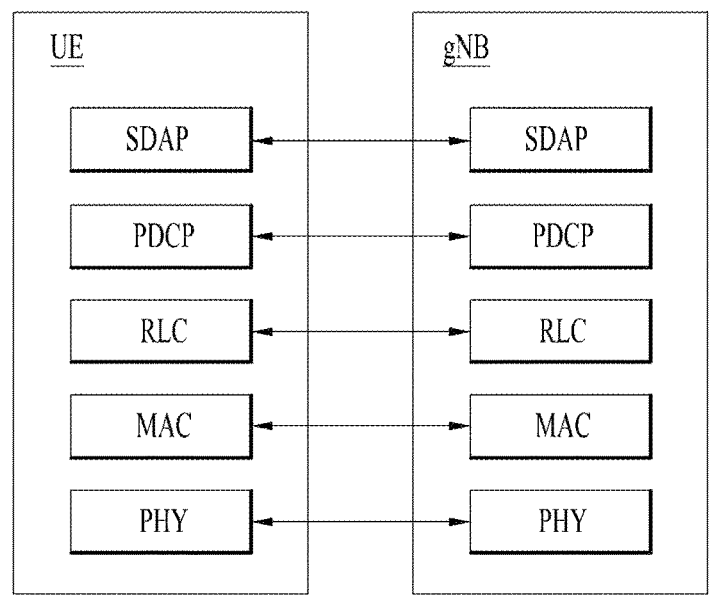
FIG. 6 illustrates an example of protocol stacks of a next generation wireless communication system.
Figure 6:
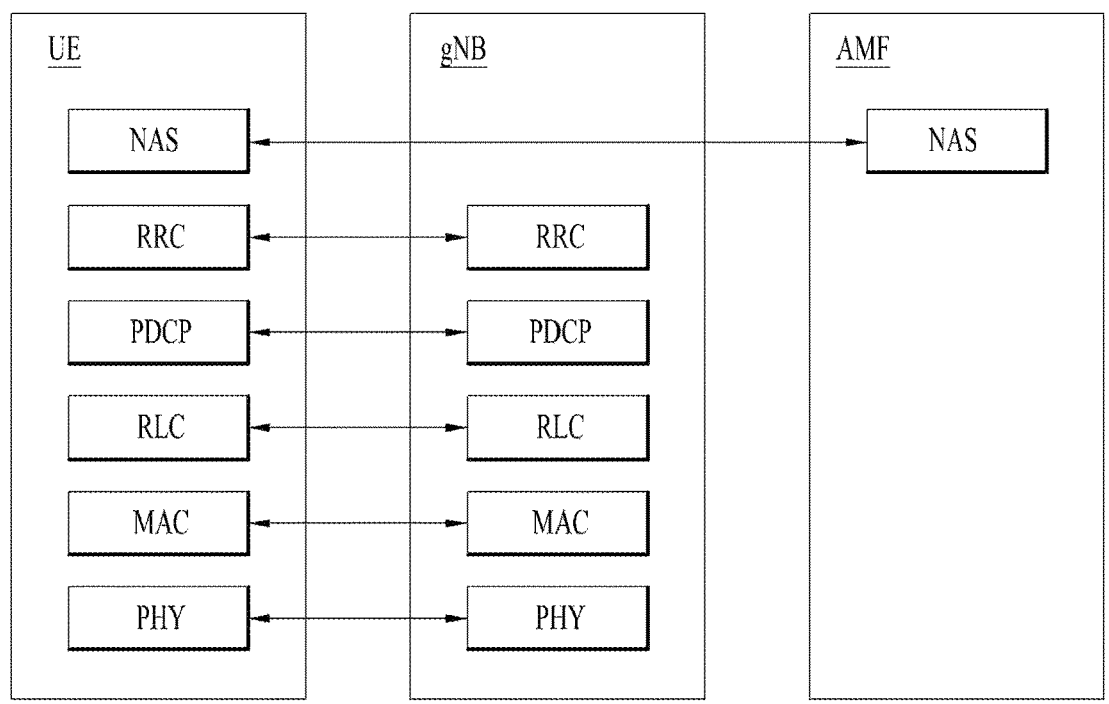

FIG. 6 illustrates an example of protocol stacks of a next generation wireless communication system. In particular, FIG. 6(a) illustrates an example of a radio interface user plane protocol stack between a UE and a gNB and FIG. 6(b) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 6(a), the user plane protocol stack may be divided into a first layer (Layer 1) (i.e., a physical layer (PHY) layer) and a second layer (Layer 2).

Referring to FIG. 6(b), the control plane protocol stack may be divided into Layer 1 (i.e., a PHY layer), Layer 2, Layer 3 (e.g., a radio resource control (RRC) layer), and a non-access stratum (NAS) layer.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signalling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by means of dynamic scheduling; priority handling between logical channels of one UE by means of logical channel prioritization; and padding. A single MAC entity can support one or multiple numerologies and/or transmission timings, and mapping restrictions in logical channel prioritisation controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

The main services and functions of RRC sublayer of NR include: broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

Figure 7:
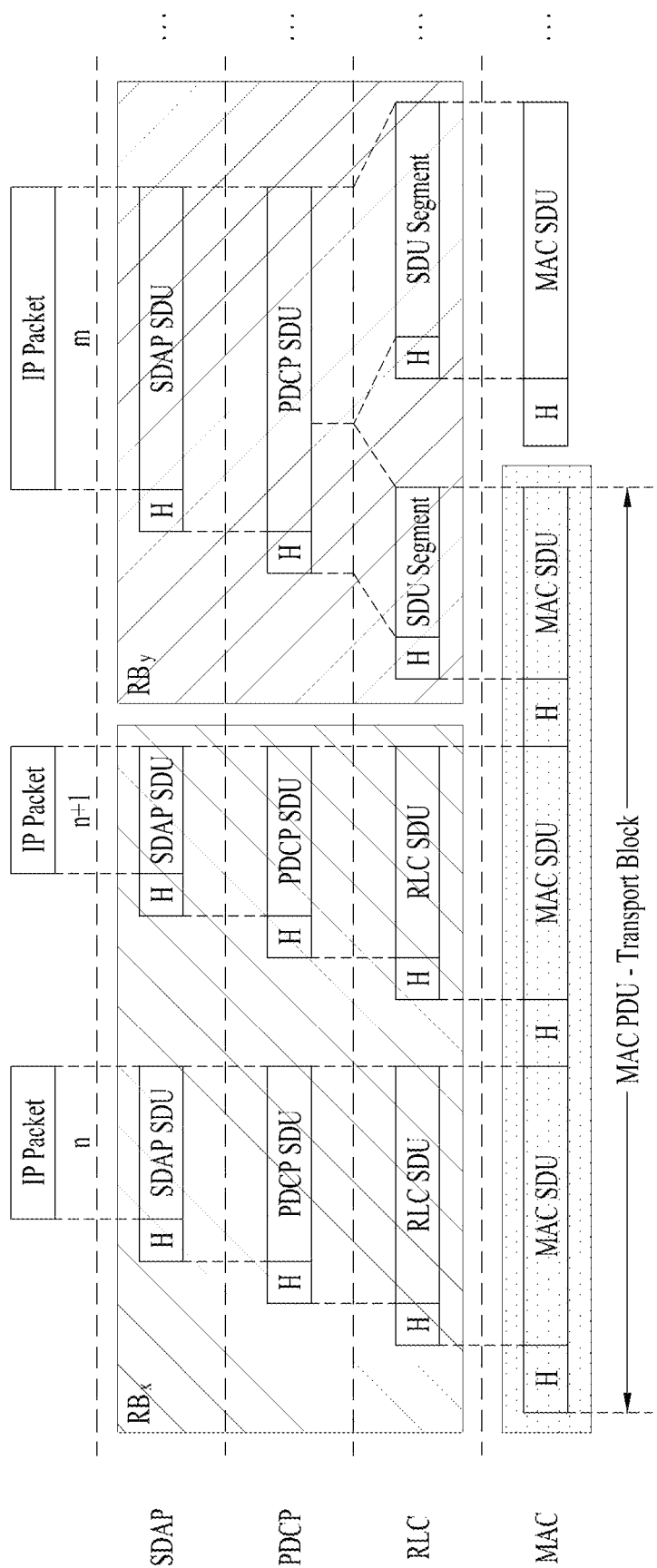
FIG. 7 illustrates a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from $RB_x$ and one RLC PDU from $RB_y$. In FIG. 7, the two RLC PDUs from $RB_x$ each corresponds to one IP packet (n and n+1) while the RLC PDU from $RB_y$ is a segment of an IP packet (m). In NR, a RLC SDU segment can be located in the beginning part of a MAC PDU and/or in the ending part of the MAC PDU. The MAC PDU is transmitted/received using radio resources through a physical layer to/from an external device.

Figure 8:
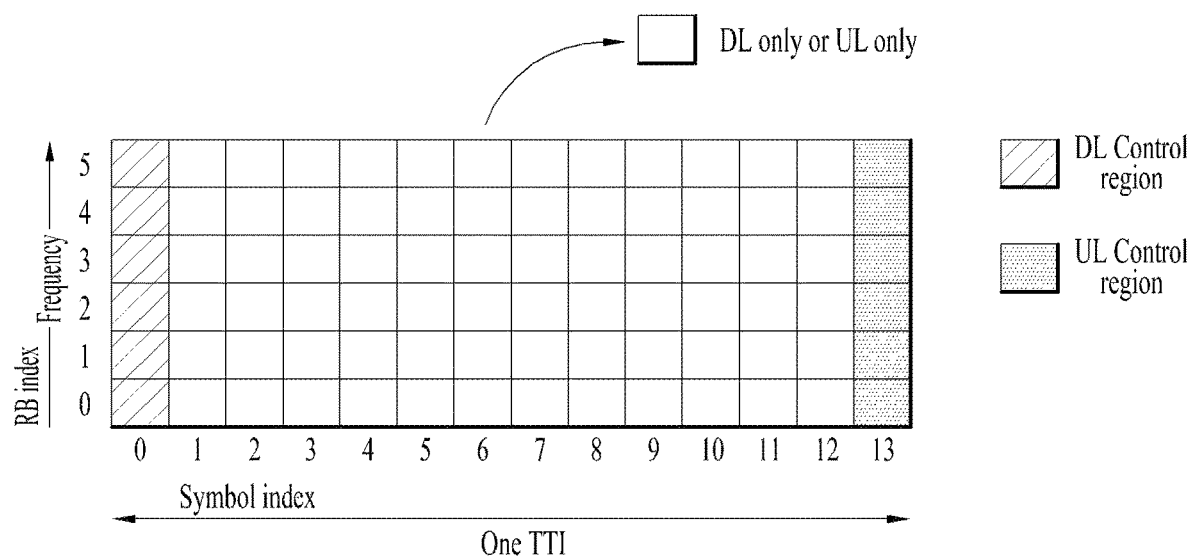
FIG. 8 illustrates a slot structure available in a new radio access technology (NR).

FIG. 8 illustrates a slot structure available in a new radio access technology (NR).

To minimize data transmission latency, in a 5G new RAT, a slot structure in which a control channel and a data channel are time-division-multiplexed is considered.

In FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 8, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

In the NR system, a scheduler (e.g. BS) assigns radio resources in a unit of slot (e.g. one mini-slot, one slot, or multiple slots), and thus the length of one TTI in NR may be different from 1 ms.

In the 3GPP based communication system (e.g. LTE, NR), a UL radio resource assigned by a scheduler is referred to as a UL grant, and a DL radio resource assigned by a scheduler is referred as a DL assignment. A UL grant or DL assignment is dynamically indicated by a PDCCH or semi-persistently configured by a RRC signaling. A UL grant or DL assignment configured semi-persistently is especially referred to as a configured UL grant or configured DL assignment.

Downlink assignments transmitted on the PDCCH indicate if there is a transmission on a downlink shared channel (DL-SCH) for a particular MAC entity and provide the relevant HARQ information. In order to transmit on the uplink shared channel (UL-SCH) the MAC entity must have a valid uplink grant which it may receive dynamically on the PDCCH or in a Random Access Response or which may be configured semi-persistently or pre-allocated by RRC.

In the LTE system, when Semi-Persistent Scheduling is enabled by RRC, the following information is provided (see 3GPP TS 36.331): Semi-Persistent Scheduling C-RNTI or UL Semi-Persistent Scheduling V-RNTI; uplink Semi-Persistent Scheduling interval semiPersistSchedIntervalUL and number of empty transmissions before implicit release implicitReleaseAfter, if Semi-Persistent Scheduling with Semi-Persistent Scheduling C-RNTI is enabled for the uplink; uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink; whether twoIntervalsConfig is enabled or disabled for uplink, only for TDD; downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink.

In the LTE system, after a Semi-Persistent Scheduling uplink grant is configured, the MAC entity:

>if twoIntervalsConfig is enabled by upper layer (e.g. RRC layer), sets the Subframe_Offset according to Table 1, and else, sets Subframe_Offset to 0; and >considers sequentially that the $N^{th}$ grant occurs in the subframe for which: (10*SFN+subframe)= [(10*SFN$_{start\ time}$+subframe$_{start\ time}$)+ N*semiPersistSchedIntervalUL+Subframe_Offset*(N modulo 2)] modulo 10240, where SFN$_{start\ time}$ and subframe$_{start\ time}$ are the system frame number (SFN) and subframe, respectively, at the time the configured uplink grant were (re-)initialised.

TABLE 1

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | −1 |
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

In LTE, once SPS is activated, a UE has to use the configured SPS resource until SPS is deactivated by a network. The explicit SPS release command and implicit SPS release mechanisms are used to deactivate SPS. These release mechanisms are designed based on the assumption that when the SPS resource is activated, a UE and a network cannot know how long the configured SPS resource will be used. For example, when a UE starts to use VoIP, nobody can expect when the call will be ended. Recently, however, SPS is not limited to VoIP and it is open to be used to schedule various types of traffic for purpose of PDCCH overhead reduction or latency reduction. In this case, a network may decide to allocate the SPS resource to a UE for a specific duration in advance based on the current remaining resource status of the network and the buffer status of the UE, i.e., the network may want to assign the SPS resource to the UE only for the predetermined time duration. In the current explicit SPS release command mechanism, the network has to transmit the explicit SPS release command at the end of the predetermined time duration, even though the network already knows when the given SPS resource of the UE will be deactivated exactly. However, if the network is able to decide when to deactivate the SPS resource of the UE in advance, there is no reason that the network has to wait until the end of the predetermined time duration before transmitting the explicit SPS release command. The current explicit SPS release command mechanism would unnecessarily increase the signaling overhead and job of the network because the network needs to continuously take care of the SPS resource for deactivation.

Figure 9:
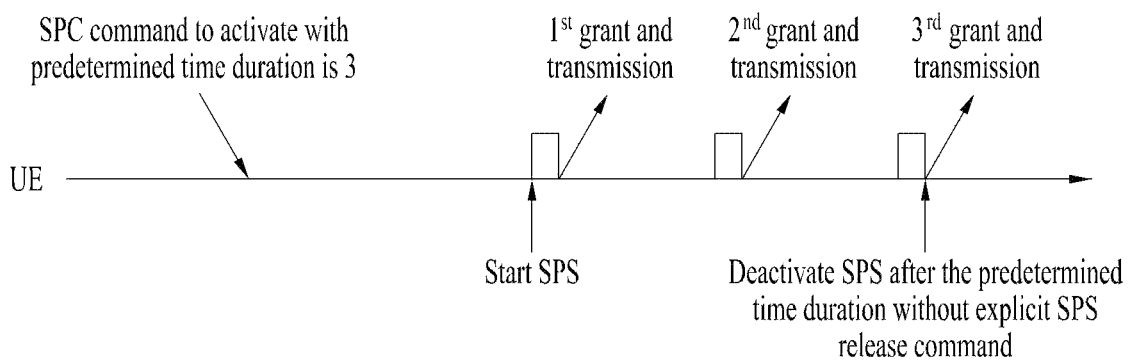
FIG. 9 illustrates an example of a predetermined time duration for semi-persistent scheduling (SPS).

FIG. 9 illustrates an example of a predetermined time duration for semi-persistent scheduling (SPS).

If the network already knows when the given SPS resource needs to be deactivated in advance, there are some ways to reduce signaling overhead and network's complexity. For example, referring to FIG. 9, the network can inform a UE of a predetermined time duration or the number of SPS transmission opportunities when configuring the SPS resource to the UE. That is, once the UE starts to use the SPS resource, the UE has to deactivate the SPS resource after using SPS only for the given time duration or for the given number of SPS transmission opportunities.

If a UE configured with a SPS resource can use the SPS resource only for a predetermined time duration, the UE would stop using the SPS resource even if the UE does not receive a SPS release command from the network or even if the UE still has data to transmit after the UE uses the SPS resource for the predetermined time duration. However, this could cause transmission delay. For example, if the UE stops using the SPS resource even when the UE still has data to transmit after using the SPS resource for the predetermined time duration, the UE may not transmit those data for a long time. This is because, in the 3GPP based communication system, a buffer status reporting (BSR) is usually not triggered until a new data belonging to a logical channel with higher priority becomes available for transmission in the RLC or PDCP entity. For example, referring to 3GPP TS 36.321, a BSR in LTE is triggered if any of the following events occurs:

>UL data, for a logical channel which belongs to a logical channel group (LCG), becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG;

>UL resources are allocated and number of padding bits is equal to or larger than the size of the Buffer Status Report MAC control element plus its subheader;

>retxBSR-Timer expires and the MAC entity has data available for transmission for any of the logical channels which belong to a LCG;

>periodicBSR-Timer expires.

The MAC entity restarts retxBSR-Timer upon indication of a grant for transmission of new data on any UL-SCH, and starts or restarts periodicBSR-Timer if the MAC entity has UL resources allocated for new transmission for a transmission time interval (TTI).

With the above LTE BSR triggering condition, after a UE has used the SPS resource for the predetermined time duration, it is not possible for a UE to trigger BSR for the remaining data until a new data belonging to a logical channel with higher priority arrives. This could cause uplink data transmission delay. If a BSR is triggered by expiry of retxBSR-Timer or periodicBSR-Timer after using the last SPS resource in the predetermined time duration, there is no uplink data transmission delay, but this could increase UE power consumption since a scheduling request or random access procedure is triggered by the UE to request for an UL grant for transmitting the BSR. If repetition transmission is applied, e.g. MTC or NB-IoT, the UE power consumption would be more serious problem. To solve these problems, the present invention is proposed as follows. The present invention can be applied to any type of UE, e.g., MTC UE, NB-IoT UE, normal UE.

Figure 10:
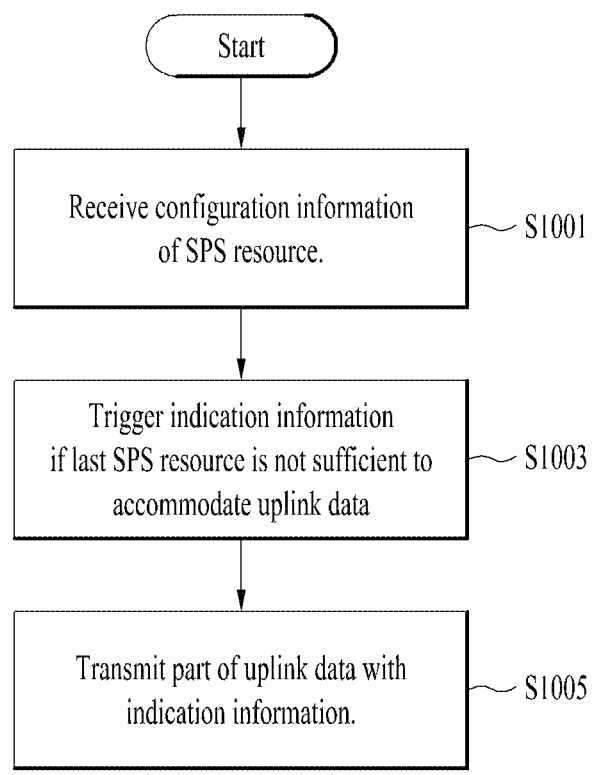
FIG. 10 illustrates a flow diagram according to an example of the present invention.

FIG. 10 illustrates a flow diagram according to an example of the present invention.

In the present invention, the SPS resource refers to a SPS resource in uplink. In the present invention, if a UE is configured with SPS resource, the UE uses the SPS resource for a predetermined time duration. When the UE transmits a MAC PDU using the last SPS resource for the predetermined time duration, if the UE still has data to transmit after transmitting the MAC PDU using the last SPS resource, the UE indicates to a network that there is remaining data in the UE side. For example, the UE may include a BSR MAC control element in the last transmitted MAC PDU using the last SPS resource.

Referring to FIG. 10, a UE is configured with a SPS resource by receiving SPS resource configuration information from a network (S1001). The SPS resource configuration information can be received by the UE through a RRC signal. The SPS resource configuration information may include information about a predetermined time duration (e.g., ms, subframes, slots, etc). Alternatively, SPS resource configuration information may include information about a SPS resource interval. In the present invention, the UE configured with the SPS resource is allowed to use the SPS resource for the predetermined time duration.

When the UE uses the last SPS resource among the SPS resources occurring within the predetermined time duration, the UE checks if there is remaining data in the UE. The remaining data means data available for transmission in upper layers (e.g., RLC, PDCP, SDAP, or RRC). If there is remaining data in the UE, the UE may determine to indicate that the UE has remaining data after transmitting a MAC PDU using the last SPS resource. In other words, if the UE has uplink data available for transmission and a valid uplink grant that the UE has for transmission of the uplink data is the last SPS resource among SPS resources occurring within the predetermined time duration, the UE checks if the last SPS resource which occurs last in the predetermined time duration is not sufficient to accommodate the uplink data. If the last SPS resource is not sufficient to accommodate the uplink data, the UE may inform the network (e.g. BS) that the UE has remaining uplink data after transmitting the MAC PDU using the last SPS resource (S1005). In order to inform the network that the UE has the remaining data, the UE can perform at least one of the followings.

The UE may trigger a BSR (S1003).

The UE may trigger and/or generate an indication informing that there is remaining uplink data after transmitting the MAC PDU using the last SPS resource (S1003). The indication may be a MAC signal, which can be a MAC control element or a field in a MAC subheader.

The UE may inform the network that the UE has remaining data after transmitting the MAC PDU using the last SPS resource, as follows.

The UE may include the BSR MAC control element (CE) in the MAC PDU to be transmitted on the last SPS resource. The buffer size field of the BSR MAC CE may be set to the amount of remaining uplink data after including the BSR MAC CE and the part of the uplink data in the MAC PDU.

Alternatively, the UE may not include the BSR MAC CE in the MAC PDU to be transmitted on the last SPS resource, but the UE trigger a scheduling request (SR) and sends the triggered SR.

Alternatively, the UE may include, in the MAC PDU to be transmitted on the last SPS resource, the indication informing that there is remaining uplink data after transmitting the MAC PDU using the last SPS resource. The indication may be a MAC signal, which can be a MAC control element or a field in a MAC subheader.

When the network receives the indication informing that the UE has remaining uplink data after the UE transmits the MAC PDU using the last SPS resource, the network considers that the UE has remaining uplink data and takes the indication into account when scheduling the UE.

Figure 11:
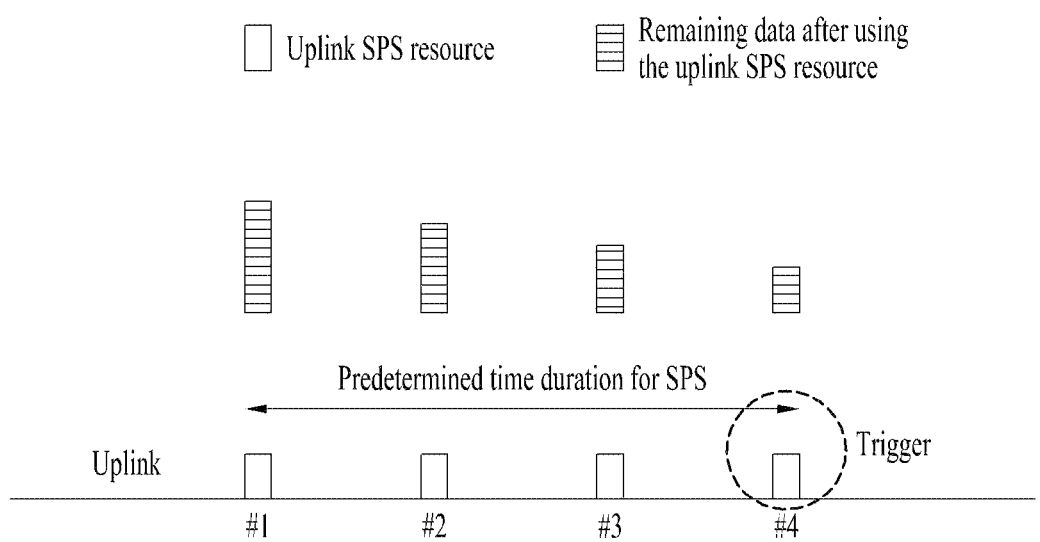
FIG. 11 illustrates an example of uplink data transmission according to the present invention.

FIG. 11 illustrates an example of uplink data transmission according to the present invention.

If the last SPS resource occurring last in a predetermined time duration, during which the UE is allowed to use SPS resource(s), is not sufficient to accommodate uplink data available for transmission in the UE at the time when the MAC entity of the UE generates a MAC PDU to be transmitted on the last SPS resource or at the time when the MAC entity allocates resources of the last SPS resource to the MAC PDU (see the logical channel prioritization procedure at 3GPP TS 36.321 or 3GPP TS 38.321), the UE may trigger an indication informing that there is remaining data available for transmission after transmitting the MAC PDU using the last SPS resource.

For example, referring to FIG. 11, when a UE uses the first, the second, and the third uplink SPS resource (SPS resources #1, #2 and #3 in FIG. 11), the UE generates MAC PDU(s) and transmit the MAC PDU(s) using the uplink SPS resource(s), respectively. When the UE uses the fourth uplink SPS resource (SPS resource #4 in FIG. 11), which is the last uplink SPS resource occurring within the predetermined time duration, the UE triggers a BSR because there is data remaining after transmitting the MAC PDU using the last SPS resource.

Figure 12:
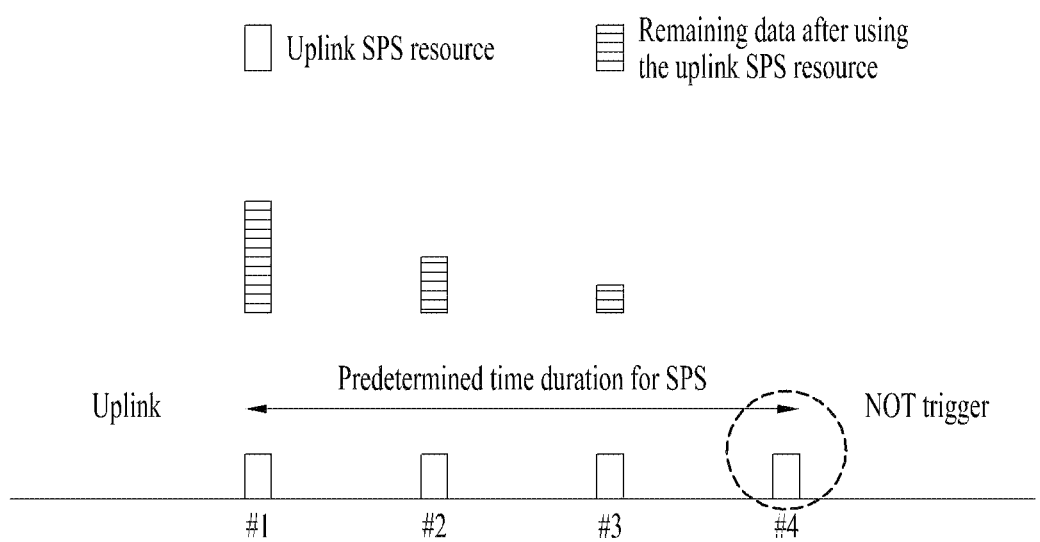
FIG. 12 illustrates another example of uplink data transmission according to the present invention.

FIG. 12 illustrates another example of uplink data transmission according to the present invention.

If the last SPS resource occurring last in a predetermined time duration, during which the UE is allowed to use SPS resource(s), is sufficient to accommodate uplink data available for transmission in the UE at the time when the MAC entity of the UE generates a MAC PDU to be transmitted on the last SPS resource or at the time when the MAC entity allocates resources of the last SPS resource to the MAC PDU (see the logical channel prioritization procedure at 3GPP TS 36.321 or 3GPP TS 38.321), the UE may not trigger an indication informing that there is remaining data available for transmission after transmitting the MAC PDU using the last SPS resource.

For example, referring to FIG. 12, when a UE uses the first, the second, and the third uplink SPS resource (SPS resources #1, #2 and #3 in FIG. 12), the UE generates MAC PDU(s) and transmit the MAC PDU(s) using the uplink SPS resource(s), respectively. When the UE uses the fourth uplink SPS resource (SPS resource #4 in FIG. 12), which is the last uplink SPS resource occurring within the predetermined time duration, the UE does not trigger a BSR because there is no more data to transmit.

Figure 13:
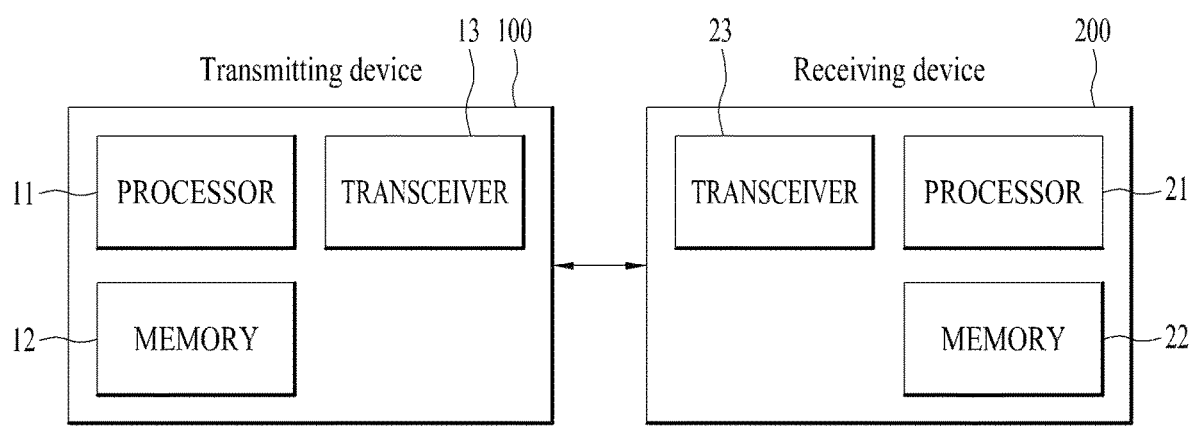
FIG. 13 is a block diagram illustrating elements of a transmitting device 100 and a receiving device 200 for implementing the present invention.

FIG. 13 is a block diagram illustrating elements of a transmitting device 100 and a receiving device 200 for implementing the present invention.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present invention. For example, the operations occurring at the protocol stacks (e.g. PDCP, RLC, MAC and PHY layers) according to the present invention may be performed by the processors 11 and 21. The protocol stacks performing operations of the present invention may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include $N_t$ (where $N_t$ is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include $N_r$ (where $N_r$ is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An transceiver supporting a MIMO function of transmitting and receiving data using a plurality of antennas may be connected to two or more antennas. The transceivers 13 and 23 may be referred to as radio frequency (RF) units.

In the examples of the present invention, a UE operates as the transmitting device 100 in UL and as the receiving device 200 in DL. In the examples of the present invention, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present invention, or control the UE transceiver to receive or transmit signals according to the present invention. The BS processor can be configured to operate according to the present invention, or control the BS transceiver to receive or transmit signals according to the present invention.

The UE transceiver may receive SPS resource configuration information from a network. The UE processor may configure SPS resource(s) periodically based on the SPS resource configuration information. In the present invention, the SPS resource configuration information may include information about a predetermined time duration (e.g., ms, subframes, slots, etc), or information about a SPS resource interval. The UE processor may be configured to use the SPS resource for the predetermined time duration. For example, the UE processor may generate a MAC PDU using the SPS resource for the predetermined time duration only, and control the UE transceiver to transmit a MAC PDU using the SPS resource for the predetermined time duration only.

When the UE processor uses the last SPS resource among the SPS resources occurring within the predetermined time duration, the UE processor is configured to check if there is uplink data remaining after using the last SPS resource. If there is remaining uplink data in the UE, the UE processor may trigger an indication informing that the UE has remaining uplink data after transmitting a MAC PDU using the last SPS resource. In other words, if the UE has uplink data available for transmission and a valid uplink grant that the UE has for transmission of the uplink data is the last SPS resource among SPS resources occurring within the predetermined time duration, the UE processor may check if the last SPS resource which occurs last in the predetermined time duration is not sufficient to accommodate the uplink data. If the last SPS resource is not sufficient to accommodate the uplink data, the UE processor may control the UE transceiver to transmit an indication informing the network (e.g. BS) that the UE has remaining uplink data after transmitting the MAC PDU using the last SPS resource. The indication may be a BSR. Alternatively, the indication may be a MAC signal, which can be a MAC control element or a field in a MAC subheader of the MAC PDU transmitted on the last SPS resource.

The UE processor may be configured to include the indication in the MAC PDU to be transmitted on the last SPS resource. If the indication is a BSR MAC CE, the UE processor may be configured to set the buffer size field of the BSR MAC CE to the amount of remaining uplink data after including the BSR MAC CE and the part of the uplink data in the MAC PDU. Alternatively, the UE processor may not include the BSR MAC CE in the MAC PDU to be transmitted on the last SPS resource, but the UE processor trigger a scheduling request (SR) and control the UE transceiver to send the triggered SR.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a network node (e.g., BS), a UE, or other devices in a wireless communication system.

The invention claimed is:

1. A method for transmitting, by a user equipment, uplink signals in a wireless communication system, the method comprising:
   receiving a semi-persistent scheduling (SPS) configuration for a predetermined time duration;
   configuring an SPS resource periodically within the predetermined time duration based on the SPS configuration;
   based on an SPS resource not being a last SPS resource among a plurality of SPS resources configured in the predetermined time duration based on the SPS configuration: performing uplink transmission, on the SPS resource which is not the last SPS resource among the plurality of SPS resources, without indication information;
   based on an SPS resource being the last SPS resource among the plurality of SPS resources: determining whether the last SPS resource among the plurality of SPS resources is sufficient to accommodate uplink data available for transmission;
   based on a determination that the last SPS resource is not sufficient to accommodate the uplink data available for transmission: transmitting, on the last SPS resource, a medium access control (MAC) protocol data unit (PDU) including the indication information; and based on a determination that the last SPS resource is sufficient to accommodate the uplink data available for transmission: transmitting, on the last SPS resource, the MAC PDU without the indication information, wherein the indication information informs a base station that there is remaining uplink data at the user equipment after transmission of the MAC PDU on the last SPS resource.

2. The method according to claim 1,
wherein the indication information is a buffer status report (BSR).

3. The method according to claim 2,
wherein the BSR is a BSR MAC control element (CE) in the MAC PDU.

4. The method according to claim 3,
wherein the BSR MAC CE includes a buffer size field set to an amount of the remaining uplink data.

5. The method according to claim 1,
wherein the indication information is a field in a MAC subheader of the MAC PDU transmitted on the last SPS resource.

6. The method according to claim 1, wherein the user equipment does not configure any SPS resource associated with the SPS configuration outside the predetermined time duration.

7. A user equipment for transmitting uplink signals in a wireless communication system, the user equipment comprising:
a transceiver;
a processor; and
a memory storing at least one program that cause the processor to perform operations comprising:
receiving a semi-persistent scheduling (SPS) configuration for a predetermined time duration;
configuring an SPS resource periodically within the predetermined time duration based on the SPS configuration;
based on an SPS resource not being a last SPS resource among a plurality of SPS resources configured in the predetermined time duration based on the SPS configuration: performing uplink transmission, on the SPS resource which is not the last SPS resource among the plurality of SPS resources, without indication information;
based on an SPS resource being the last SPS resource among the plurality of SPS resources: determining whether the last SPS resource among the plurality of SPS resources is sufficient to accommodate uplink data available for transmission;
based on a determination that the last SPS resource is not sufficient to accommodate the uplink data available for transmission: transmitting, on the last SPS resource, a medium access control (MAC) protocol data unit (PDU) including the indication information; and
based on a determination that the last SPS resource is sufficient to accommodate the uplink data available for transmission: transmitting, on the last SPS resource, the MAC PDU without the indication information,
wherein the indication information informs a base station that there is remaining uplink data at the user equipment after transmission of the MAC PDU on the last SPS resource.

8. The user equipment according to claim 7,
wherein the indication information is a buffer status report (BSR).

9. The user equipment according to claim 8,
wherein the BSR is a BSR MAC control element (CE) in the MAC PDU.

10. The user equipment according to claim 9,
wherein the BSR MAC CE includes a buffer size field set to an amount of the remaining uplink data.

11. The user equipment according to claim 7,
wherein the indication information is a field in a MAC subheader of the MAC PDU transmitted on the last SPS resource.

12. The user equipment according to claim 7, wherein the user equipment does not configure any SPS resource associated with the SPS configuration outside the predetermined time duration.

* * * * *